United States Patent

Nagaraj et al.

[11] Patent Number: 5,913,927
[45] Date of Patent: *Jun. 22, 1999

[54] METHOD AND APPARATUS FOR MANAGEMENT OF FAULTY DATA IN A RAID SYSTEM

[75] Inventors: Ashwath Nagaraj; Ashok Bhaskar, both of Fremont, Calif.

[73] Assignee: Mylex Corporation, Fremont, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/573,127

[22] Filed: Dec. 15, 1995

[51] Int. Cl.[6] .............................. G06F 11/00; G06F 12/16
[52] U.S. Cl. ................................ 714/8; 714/7; 714/710; 714/718; 714/764; 714/805; 711/114
[58] Field of Search ......................... 395/182.06, 182.03, 395/182.04, 182.05, 183.05, 183.18, 440, 441, 442, 497.01, 444–449, 460, 486, 415, 416; 371/2.2, 10.2, 10.3, 21.1, 51.1, 40.1–40.4, 40.11; 364/268.3, 245, 245.3; 711/113, 114, 117, 118, 119, 120, 122, 133, 159, 170

[56] References Cited

U.S. PATENT DOCUMENTS

| | | | |
|---|---|---|---|
| 5,341,381 | 8/1994 | Fuller | 395/182.04 |
| 5,457,791 | 10/1995 | Matsumoto et al. | 395/182.03 |
| 5,463,643 | 10/1995 | Gaskins et al. | 371/40.1 |
| 5,522,065 | 5/1996 | Neufeld | 395/182.04 |
| 5,550,975 | 8/1996 | Ichinomiya et al. | 395/185.04 |
| 5,572,660 | 11/1996 | Jones | 395/182.04 |
| 5,572,661 | 11/1996 | Jacobson | 395/182.05 |

*Primary Examiner*—Dieu-Minh Le
*Attorney, Agent, or Firm*—Fish & Richardson P.C.

[57] ABSTRACT

A RAID (3, 4, or 5) disk array memory system incorporates a method and apparatus for the management of faulty data that eliminates the unintentional creation of spurious data when a double fault occurs. For example, when a disk drive failure occurs in one channel and the failed disk is replaced, reconstruction of the data can be achieved because a parity drive channel is provided for correcting errors. If a read error occurs during reconstruction of the failed disk data, the block corresponding to the error block does not allow the reconstruction of the corresponding failed disk block. To prevent the misuse of the two data blocks, a bad data table (BDT) is constructed that lists the addresses of the block just read and the block to be reconstructed. Also a standard filler block is written into the two bad blocks and a new parity block is created. The addresses of all access requests to the memory array are compared with the BDT and, if not listed, the access proceeds. If an address is listed, an error signal is returned. For a listed write request, the bad block address is deleted from the BDT, new data written into the block and a new parity block computed and stored.

16 Claims, 7 Drawing Sheets

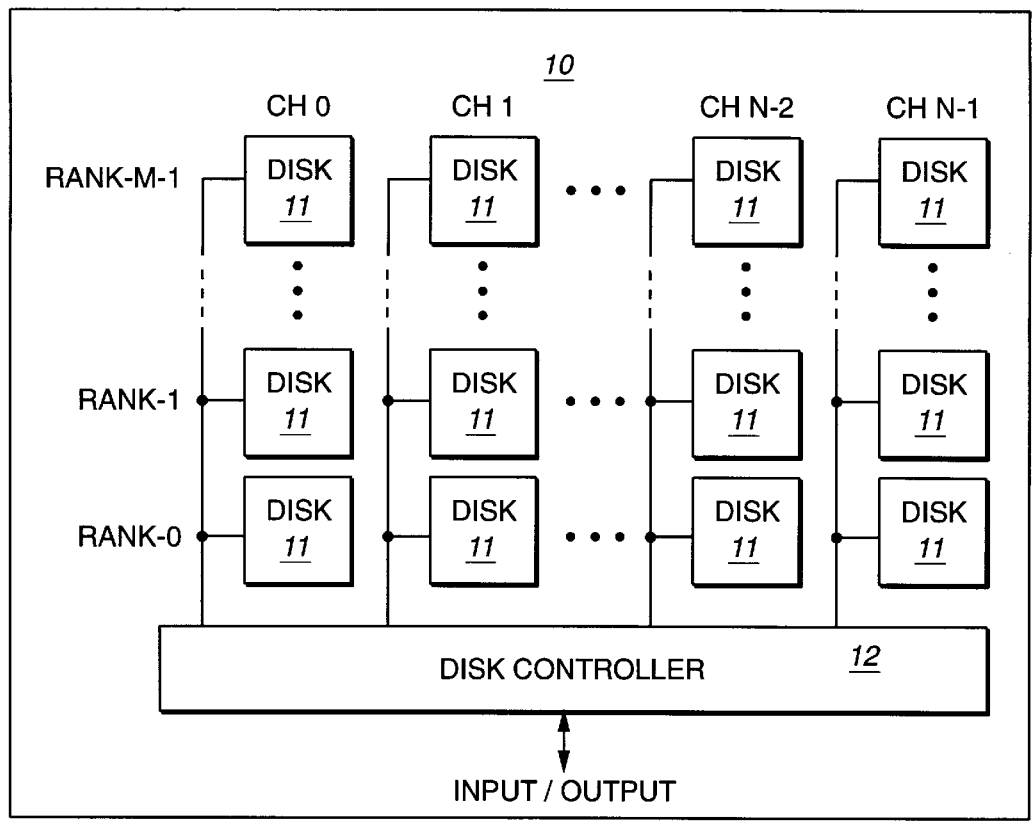
FIG._1
*(PRIOR ART)*
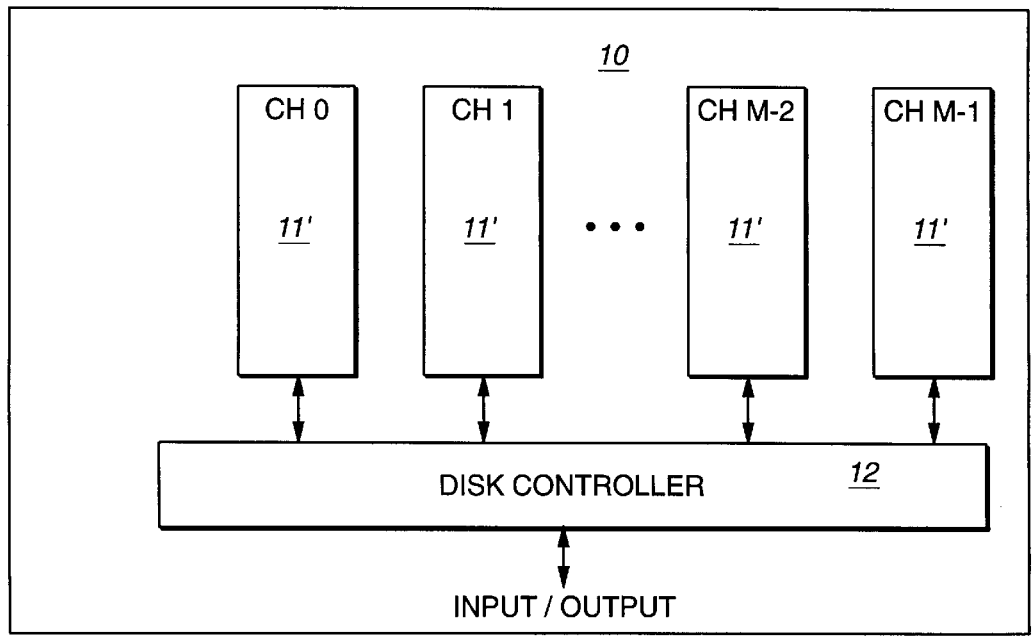
FIG._2
*(PRIOR ART)*

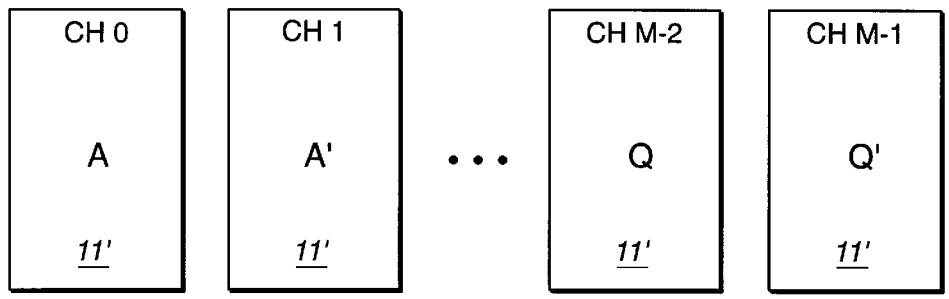
FIG._3a (PRIOR ART)
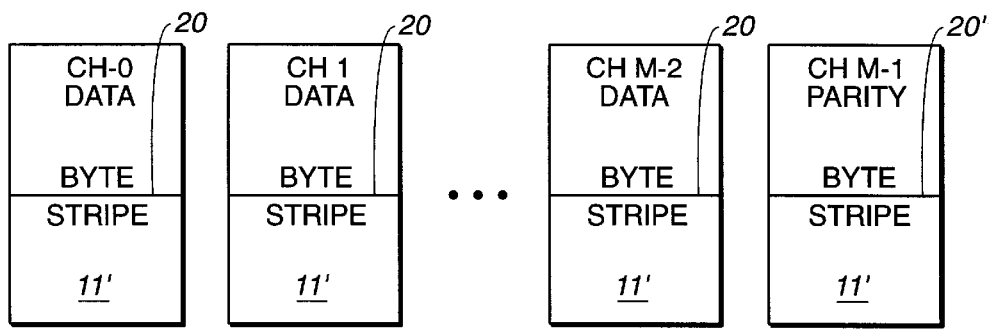
FIG._3b (PRIOR ART)
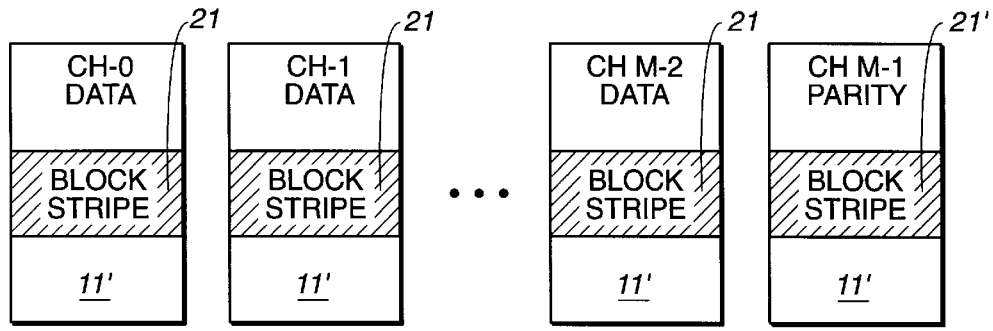
FIG._3c (PRIOR ART)
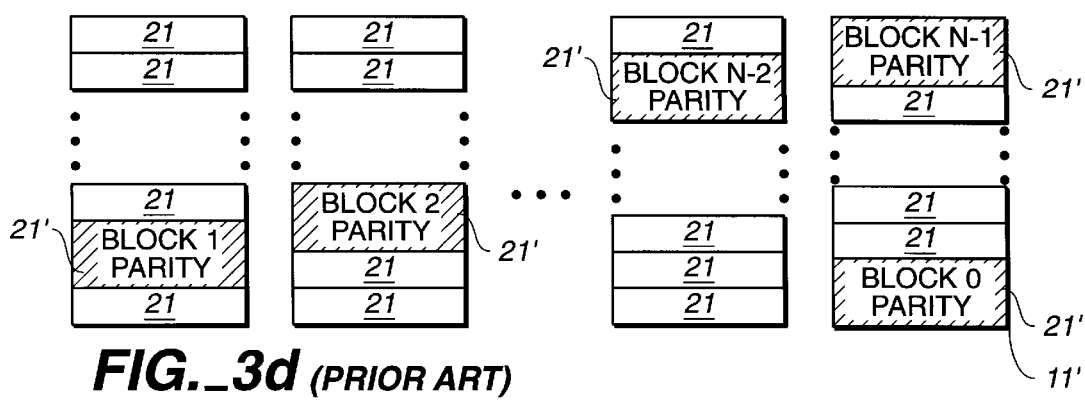
FIG._3d (PRIOR ART)

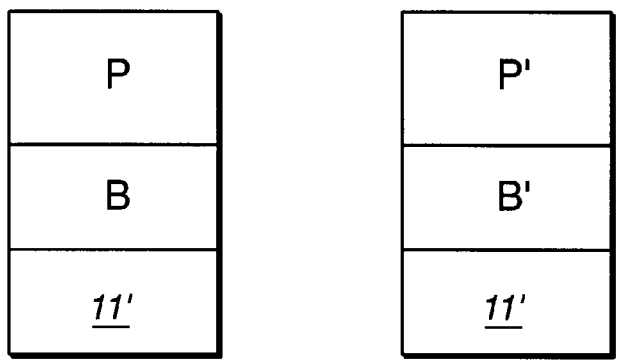
FIG._4a (PRIOR ART)
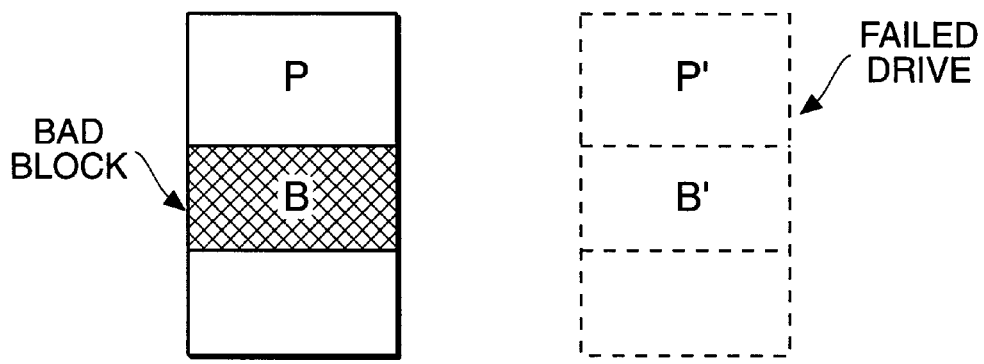
FIG._4b (PRIOR ART)
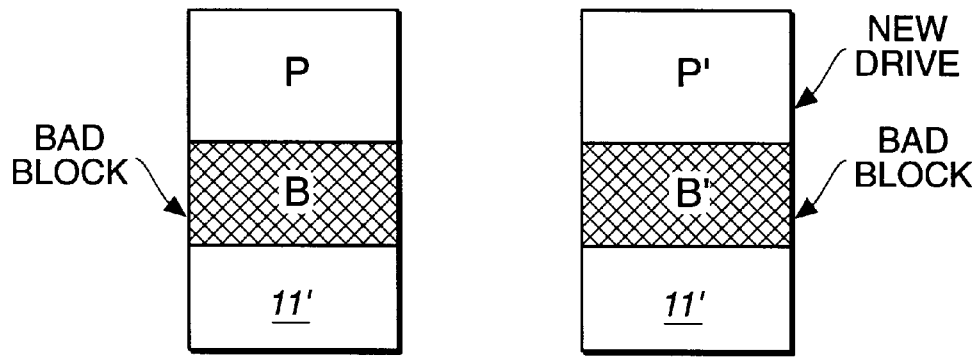
FIG._4c (PRIOR ART)

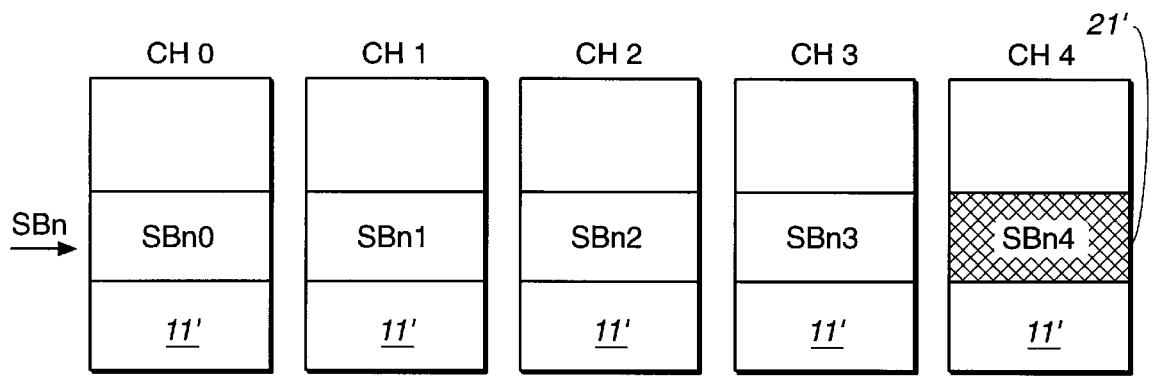
FIG._5a (PRIOR ART)
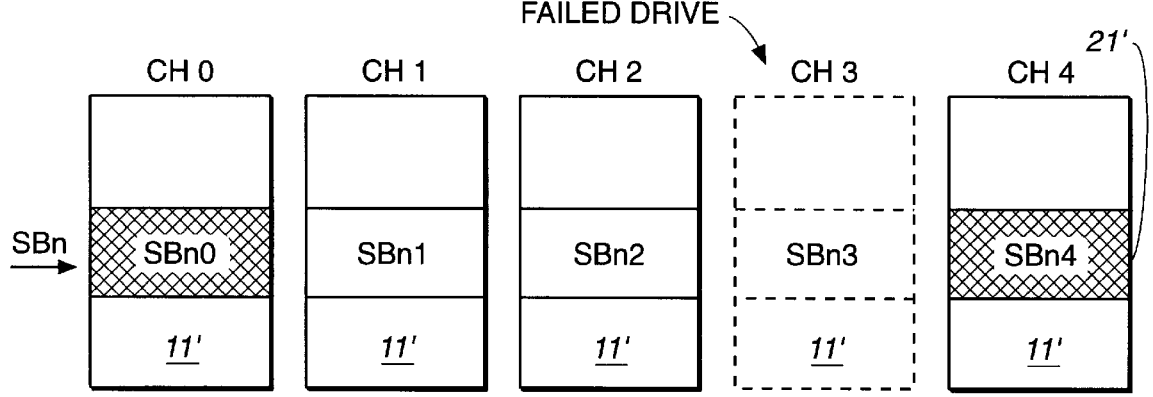
FIG._5b (PRIOR ART)
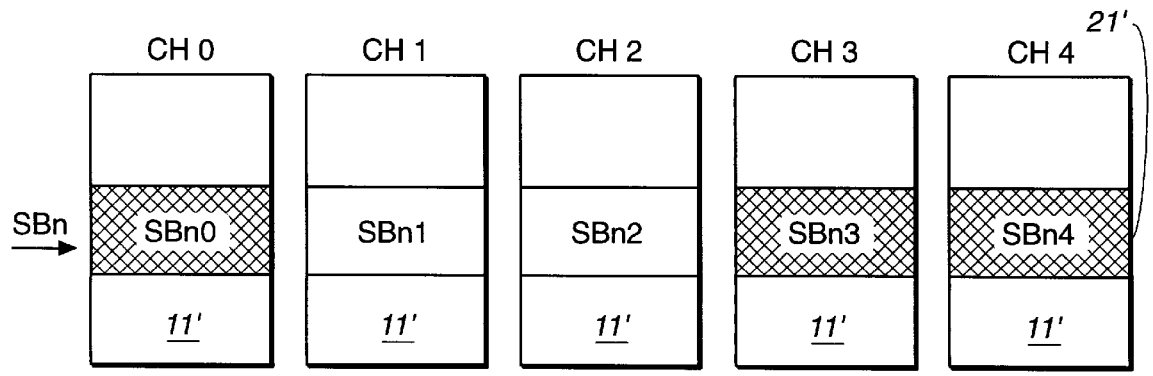
FIG._5c (PRIOR ART)

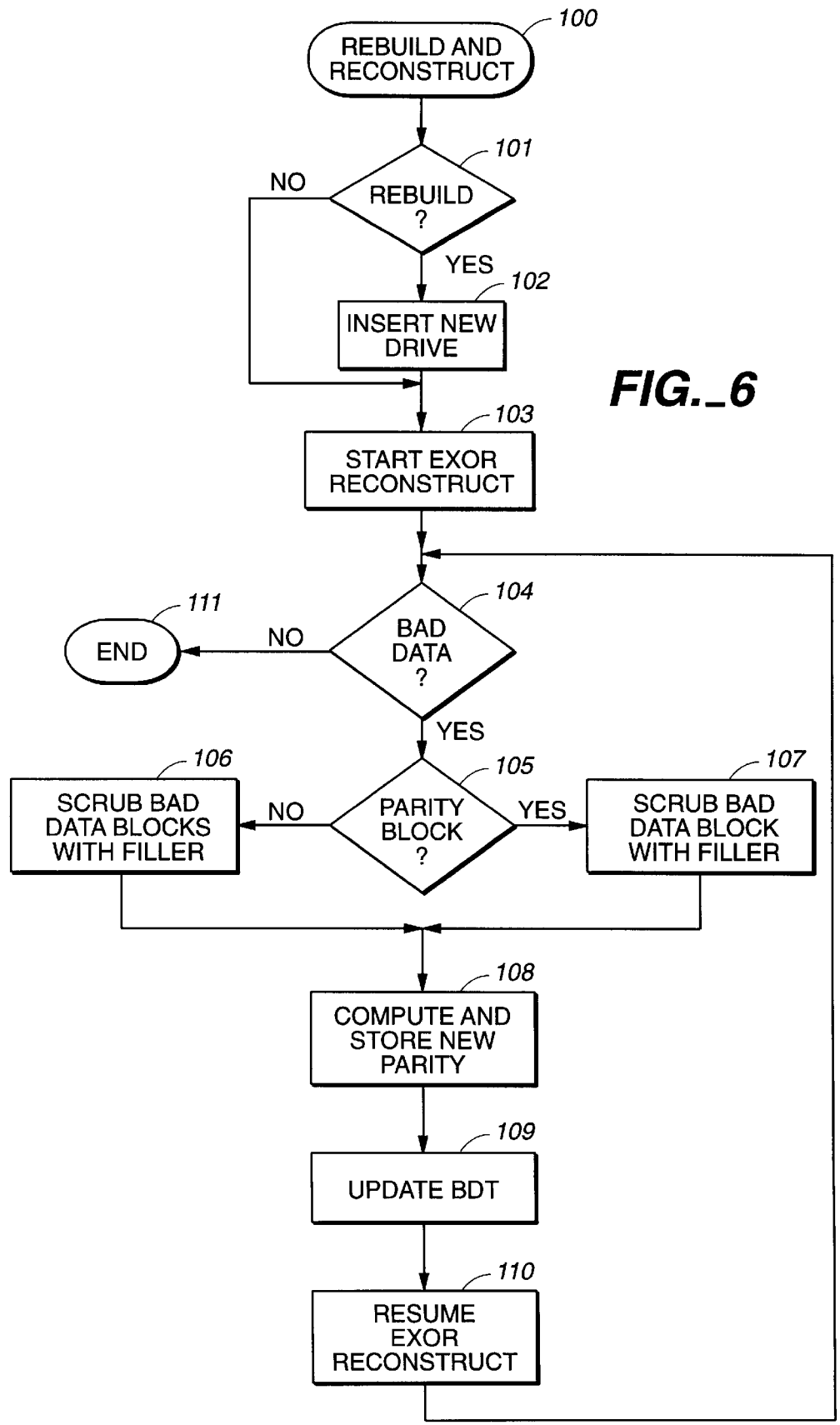
FIG._6

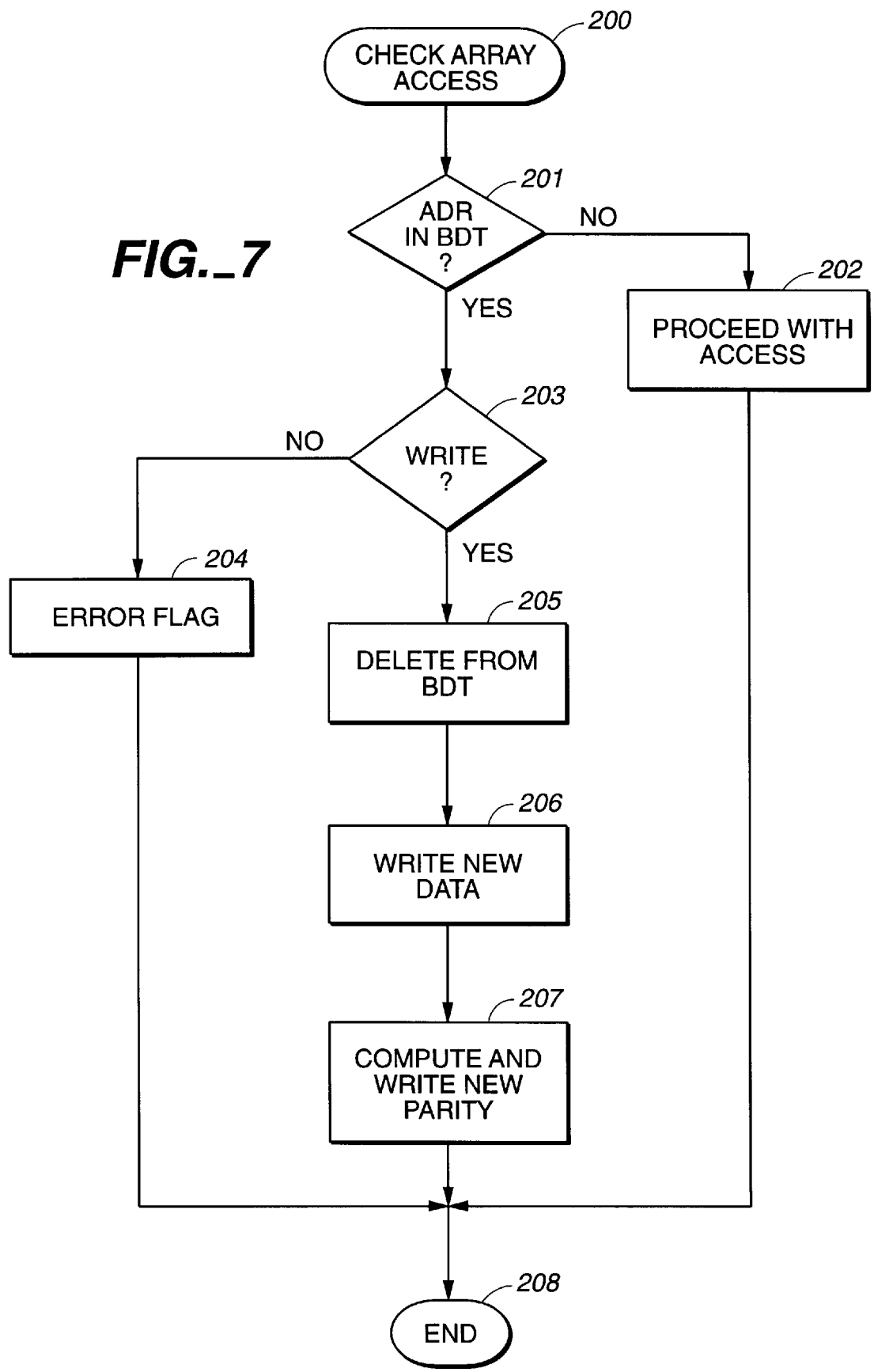
FIG._7

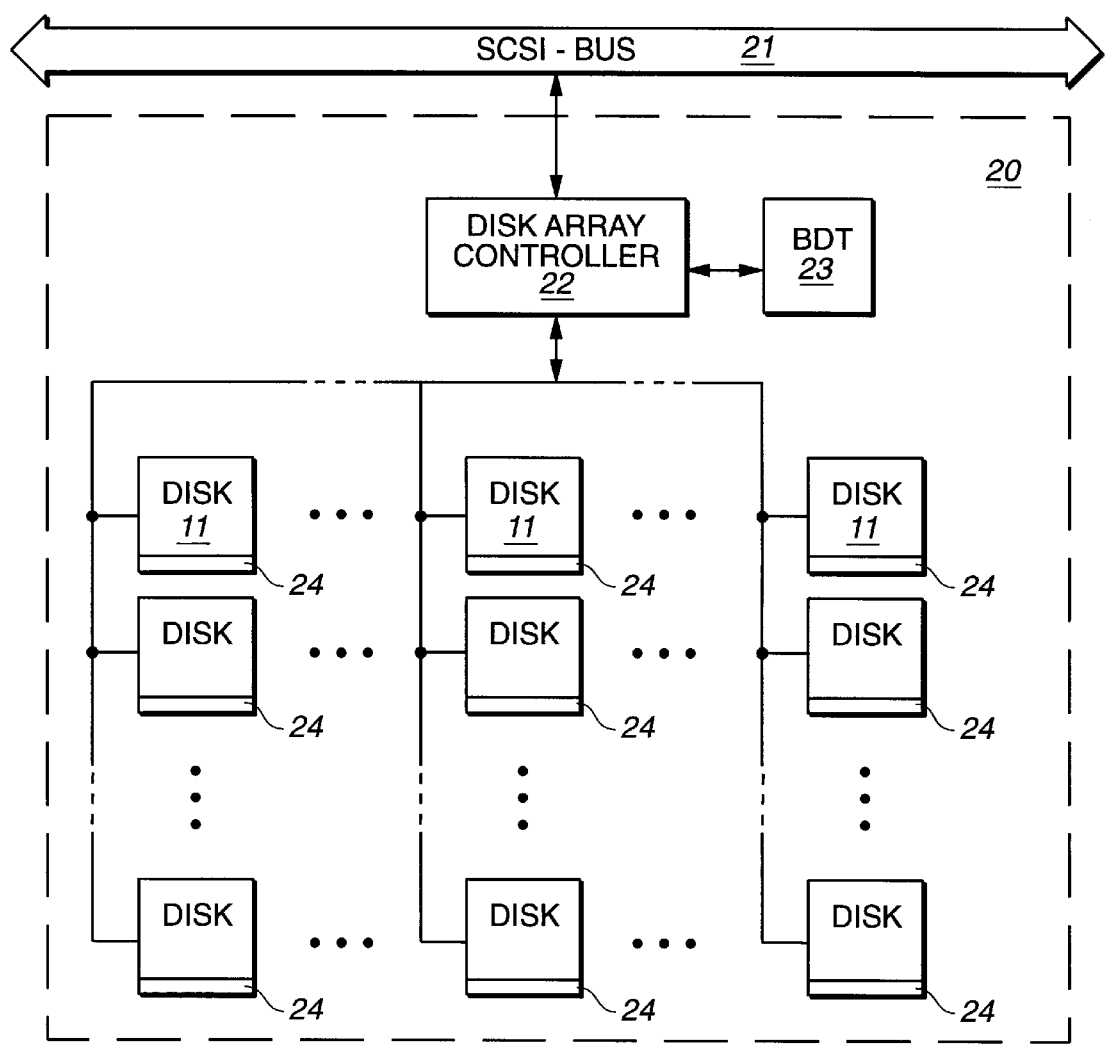
FIG._8

METHOD AND APPARATUS FOR MANAGEMENT OF FAULTY DATA IN A RAID SYSTEM

BACKGROUND OF THE INVENTION

The invention pertains to the field of fault tolerant arrays of hard disks that are known as Redundant Arrays of Inexpensive Disks (RAID). More specifically the invention relates to the management and correction of undetected read errors in a RAID system that are discovered when a disk failure requires the replacement and build-up of a disk other than that containing the undetected read error.

SUMMARY OF THE INVENTION

This invention provides a faulty data management subsystem that avoids the potential generation of spurious data when two bad data blocks exist within the same RAID data group because of a disk recording medium error in one channel of the array and the failure, replacement, and rebuild of a disk drive on another channel. The faulty data management subsystem of the invention includes:

a) a disk rebuild routine for rebuilding a failed drive that checks for a bad data block amongst the channels being used to reconstruct the data on the failed disk and, if found, scrubbing the bad data block by writing a filler code in that block and in the corresponding block of the disk that is being rebuilt;

b) computing a new parity block corresponding to the bad data block by using all channels including those with filler code;

c) updating a bad data table that lists all bad data blocks; and d) checking each disk array access request to determine if the data address of that request is listed in the bad data table, and, if not, allowing the access to proceed, otherwise checking if the access request is for a write and, if so, allowing the write, deleting the block address from the bad data table and generating a new parity block, and, if not, generating an error signal.

The present invention provides means for managing faulty data in RAID systems without incurring the potential problems described above.

Because a byte stripe is a single address block, it may be seen that a RAID-3 and RAID-4 system are the same except for block length. Consequently, all following references to a block will be understood to include the RAID-3 byte stripe unless otherwise indicated.

Also, "RAID system" will be used to indicate RAID-3, -4 and -5 systems unless indicated otherwise.

RAID systems, based on magnetic disk technology developed for personal computers, offer an attractive alternative to single large expensive disk memories by providing improved performance, reliability, and power consumption. The manufacturers of small disks can offer such performance because of the efforts at standardization in defining higher level peripheral interfaces such as the ANSI X3.131-1986 Small Computer Synchronous Interface (SCSI). This has led to the development of arrays of inexpensive disks which are organized in an interleaved manner for large block transfers of data, or arranged for independent parallel access for small transaction processing.

The formation of large disk arrays introduces reliability problems which result from the use of a large multiplicity of electromechanical devices. The mean-time-to-failure (MTTF) for an array has been estimated to increase with the number of disks in an array (Patterson, D. A., Gibson, G., and Katz, R. H., "A Case for Redundant Arrays of Inexpensive Disks (RAID), Report No. UCB/CSD 87/391, December 1987, Computer Science Division (EECS), University of California, Berkeley, Calif. 94720).

BRIEF DESCRIPTION OF THE DRAWINGS

The present invention may be more fully understood from the detailed description given below and from the accompanying drawings of the preferred embodiments of the invention, which, however should not be taken to limit the invention to the specific embodiment but are for explanation and understanding only.

FIG. 1 is a block diagram of a prior art MxN disk array, including a disk array controller.

FIG. 2 shows the prior art logical disk area configuration based on the array of FIG. 1.

FIG. 3(a) shows the memory map of a prior art RAID-1 system.

FIG. 3(b) shows the memory map of a prior art RAID-3 system.

FIG. 3(c) shows the memory map of a prior art RAID-4 system.

FIG. 3(D) shows the memory map of a prior art RAID-5 system.

FIGS. 4(a), 4(b), and 4(c) show an initial RAID-1 memory map, a double faulted memory RAID-1 memory map, and a rebuilt, but double faulted RAID-1 memory map, respectively, according to the prior art.

FIGS. 5(a), 5(b), and 5(c) show an initial RAID-5 memory map, a double faulted RAID-5 memory map, and a rebuilt, but double faulted, RAID-5 memory map, respectively, according to the prior art.

FIG. 6 is a flow diagram of the disk rebuild and reconstruct method of the invention.

FIG. 7 is a flow diagram of the method of the invention for accessing the array.

FIG. 8 shows the hardware configuration of the invention for a RAID faulty data management system.

DESCRIPTION OF THE PREFERRED EMBODIMENTS

FIG. 6 is a flow diagram of the disk rebuild and reconstruction method 100 used to circumvent the problem of generating spurious data because a disk read fault has occurred on a channel of a RAID system while reconstructing a corresponding data block on another channel. The reconstruction of a data block or rebuild of a disk drive is accomplished by bit-by-bit EXORing of the corresponding bits of the remaining blocks belonging to the same group that share a common parity block.

Disk rebuild and reconstruction method 100 begins at step 101 in which the EXOR method of reconstruction begins. During reconstruction, step 104 checks for an indication that one of the blocks needed for reconstruction is bad. If the reconstruction is completed without detecting a bad block, the process terminates at step 111. Otherwise, step 105 checks if the bad data block needed for reconstruction is a parity block. If so, step 107 writes a filler block to the block that is to be reconstructed and step 109 updates the bad data table (BDT) by recording that the data block is non-recoverable (bad). (The filler block may contain any convenient alphanumeric code.) If the bad data block of step 104 is not a parity block, step 106 scrubs the bad data block by writing a filler block to replace the bad data block and, in step 107, also writes a filler block to the corresponding block that was to be reconstructed. Step 109 updates the BDT by recording that both the block in step 104 and the corresponding block of the channel being reconstructed is bad. Each entry in the BDT identifies a block as containing artificial data and hence non-recoverable data. Step 108 computes new parity data by EXORing all of the data channel blocks including the filler blocks and writes a new parity block and step 110 resumes the reconstruction process by returning to step 104.

The procedure of FIG. 6 ensures that (1) if a read error occurs during reconstruction in one of the data blocks, all of the remaining "good" data blocks are recoverable, and (2) the artificial data of the filler blocks can not be confused with real data.

Step 109 updates a "bad data table", or BDT, that is located in disk controller 12, and may also be located in a reserved section of each of the disks. The BDT contains a list of all bad data blocks (filler blocks) so that any read request to the disk array first compares the target address with the addresses listed in the BDT and returns an appropriate error signal to the requesting agent if the address is listed. After the BDT update, the process of reconstruction continues in step 110, and the monitoring in step 104 continues until completed. If additional bad data blocks are found in step 104, steps 105–110 are repeated as required.

The method for operating a comparator for checking array access 200, shown in the flow diagram of FIG. 7, is used to manage the use of a BDT in conjunction with the RAID memory system. The method is invoked whenever an access is requested and begins in step 201 by checking if an access request is to a bad data block whose address is listed in the BDT, and, if not, proceeds with the access in the normal operating mode. If the address is listed in the BDT, step 203 determines if the access is for a write operation, and, if not, an error flag is generated in step 204. The error flag advises the host system that the read request is to a non-recoverable data block. If the request is for a write access, step 205 deletes the block address from the BDT and permits the write circuitry to write the new data to the block address in step 206, thus scrubbing the bad data block status. Step 207 is for computing the new block parity and writing it into the corresponding parity block associated with the accessed data group.

FIG. 8 is a block diagram that shows the architecture of a RAID system of this invention using the methods outlined in FIGS. 6 and 7. Typically, RAID system 20 with faulty data management of the type described above is interfaced through its controller 22 from a SCSI bus 21. (SCSI stands for a well known industry standard bus as described in "Small Computer System Interface-2", American National Standard X3T9.2/86-109). Bus 21 connects RAID system 20 to the host system. Disk array controller 22 provides the necessary logic to map any logical address associated with a memory access into the corresponding physical address, directs data traffic, controls the operation of each disk drive and provides status information to the host. BDT 23 is shown coupled to controller 22 but may also be an integral part of an integrated chip disk array controller. Also, each disk 11 of the array is shown having a local BDT 24 in which the bad data information for each disk is optionally stored so that an access address can be checked at the disk level rather than at the array level in disk controller 22.

As will be understood by those skilled in the art, many changes in the methods and apparatus described above may be made by the skilled practitioner without departing from the spirit and scope of the invention, which should be limited only as set forth in the claims which follow.

What is claimed is:

1. An apparatus for managing faulty data in a multichannel memory system having a memory array controller for controlling access to the memory system, for memory failure detection, for memory error detection, and for reconstruction of a failed memory channel, the memory system having at least three memory channels where each channel includes one or more modules, each module having a failure and read error detection means, and each memory module being separately replaceable upon failure, the apparatus, accessible to the memory controller, comprising:

a) a bad data table (BDT) for storing addresses of non-recoverable data blocks in a replacement memory module, where the replacement memory module stores data reconstructed from a failed first memory module in the memory system, and addresses of other non-recoverable data blocks associated with other memory modules in the memory system, the non-recoverable data blocks arising upon an occurrence of a fault in a second memory module in the memory system prior to completion of reconstruction and storage of data in the replacement memory module;

b) a write circuit operable after the initiation of a reconstruction of a failed first memory module for writing filler data to a bad block location in the second memory module when a fault is detected in the second memory module during reconstruction of data stored in the first memory module, for writing filler data to an associated location in the replacement memory module and for writing to the BDT addresses of bad data blocks representing non-recoverable data; and c) detection circuitry for detecting memory access requests to addresses stored in the BDT, for returning a non-recoverable data error signal to a host system if the access request is a read request, and, if the access request is a write request, permitting the write to the BDT listed address and deleting the listed address from the BDT.

2. The apparatus of claim 1 wherein the multichannel memory system is a RAID-3 memory array.

3. The apparatus of claim 1 wherein the multichannel memory system is a RAID-4 memory array.

4. The apparatus of claim 1 wherein the multichannel memory system is a RAID-5 memory array.

5. The apparatus of claim 1 wherein the BDT is part of the memory array controller.

6. The apparatus of claim 1 wherein the BDT is stored in a reserved section of each memory module.

7. The apparatus of claim 1 wherein the BDT is stored in a memory in the memory array controller and in a reserved section of each memory module.

8. A method for managing faulty data in a memory system having memory error detection and single memory module correction means, the memory system having at least three memory modules capable of detecting failure and read errors, each memory module being separately replaceable upon failure, the method comprising the steps of:

a) detecting a first read error of a memory module;

b) determining if the first read error is due to a failure of the memory module and, if so, replacing the failed memory module and using the single memory module correction means for reconstructing data and storing the reconstructed data in the replacement memory module;

c) monitoring all other memory modules during the reconstruction process for a second read error that would prevent reconstructing data for a first block in the replaced memory module where the second read error is associated with a second block in a second memory module, if such a second read error is detected in a second memory module in the memory system at a second block during the reconstruction of a first block in the replaced memory module and, if neither the first nor second block is a parity block, i) entering addresses of the first and second blocks into a bad data table (BDT), ii) writing a filler block to both the first and the second blocks, and iii) computing and replacing a corresponding parity block in an associated stripe of the memory system using the first and the second blocks together with all corresponding data blocks in the associated stripe of the memory system, otherwise, i) writing a filler block to whichever of the first block and the second block is a data block, and ii) computing and writing a corresponding parity block to the other of the first and second block which is designated to contain parity information using the filler block with all corresponding data blocks, and, then continuing reconstructing data in the replaced memory module until finished; and d) monitoring all memory access requests to the memory system by comparing a requested address to the BDT listed addresses, and, if the address is not listed in the BDT, allowing the access request to proceed, otherwise checking if the request is a write request, and, if not, returning a non-recoverable data error signal, otherwise allowing the write request to proceed so that an addressed filler block is replaced by a valid data block, and then computing and entering a new corresponding parity data block, whereby data stored in blocks in a same group as the first and second block m a y be recovered if a single subsequent failure occurs in any module in the memory system using the computed parity information, filler data and remaining group data.

9. The method of claim 8 wherein the memory system is a RAID-3 memory.

10. The method of claim 8 wherein the memory system is a RAID-4 memory array.

11. The method of claim 8 wherein the memory system is a RAID-5 memory array.

12. A memory array system with a faulty data management system handling multiple faults, comprising:

a) a memory array including at least three memory modules, each memory module being separately replaceable upon failure, and each module having a failure and read error detector;

b) a memory array controller for coupling the memory array to a memory bus, for Controlling access to the memory array, for memory array failure detection and single memory module correction and for communicating memory status over the memory bus, the memory array controller further having, i) a bad data table (BDT) for storing addresses of non-recover able data blocks detected during a reconstruction of a first memory module, the reconstruction due to the occurrence of a fault in a first memory module requiring the replacement thereof and the bad data table for storing addresses of non-recoverable data blocks arising after a subsequent fault is detected in a second memory module prior to completion of the reconstruction of data stored in the first memory module, ii) write circuitry for writing filler data blocks to blocks corresponding to non-recoverable data blocks in the replaced first memory module and the second memory module and for writing non-recoverable data block addresses to the BDT, and iii) a comparator for detecting memory access requests to bad data blocks by comparing a memory access request address with the BDT stored addresses, for returning a non-recoverable error signal to a requesting agent if the access request is a read request and the address is stored in the BDT, and for permitting the access request to proceed if the request is for a write access.

13. The memory array system of claim 12 wherein each memory module has a reserved memory area for storing the BDT.

14. The memory array system of claim 12 wherein the memory array system is a RAID-3 memory system.

15. The memory array system of claim 12 wherein the memory array system is a RAID-4 memory system.

16. The memory array system of claim 12 wherein the memory array system is a RAID-5 memory system.

* * * * *